United States Patent
Baker et al.

(10) Patent No.: US 11,328,408 B2
(45) Date of Patent: May 10, 2022

(54) SYSTEMS AND METHODS FOR COLOR AGNOSTIC MATERIAL FACE DETECTION

(71) Applicant: SoftWear Automation Inc., Cumming, GA (US)

(72) Inventors: Michael J. Baker, Acworth, GA (US); Alexander Ren Gurney, Atlanta, GA (US); Senthil Ramamurthy, Atlanta, GA (US)

(73) Assignee: SOFTWEAR AUTOMATION, INC., Cumming, GA (US)

( * ) Notice: Subject to any disclaimer, the term of this patent is extended or adjusted under 35 U.S.C. 154(b) by 0 days.

(21) Appl. No.: 16/987,638

(22) Filed: Aug. 7, 2020

(65) Prior Publication Data

US 2022/0044387 A1  Feb. 10, 2022

(51) Int. Cl.
*G06K 9/00* (2006.01)
*G06T 7/00* (2017.01)

(52) U.S. Cl.
CPC .. *G06T 7/0004* (2013.01); *G06T 2207/10024* (2013.01); *G06T 2207/20081* (2013.01); *G06T 2207/30124* (2013.01)

(58) Field of Classification Search
None
See application file for complete search history.

(56) References Cited

U.S. PATENT DOCUMENTS

| | | | |
|---|---|---|---|
| 2002/0076096 A1* | 6/2002 | Silber | G01J 1/32 382/152 |
| 2003/0169904 A1* | 9/2003 | Koele | A61F 13/15772 382/111 |
| 2018/0315179 A1* | 11/2018 | Safrani | G06T 7/73 |
| 2020/0160503 A1* | 5/2020 | Woytowich | G06K 9/4671 |
| 2020/0363815 A1* | 11/2020 | Mousavian | G06K 9/6218 |

FOREIGN PATENT DOCUMENTS

| | | |
|---|---|---|
| JP | H085564 A | 1/1996 |
| JP | 2009139239 A2 | 6/2009 |

OTHER PUBLICATIONS

Roh, Young Jun, et al. "Visual inspection system with flexible illumination and autofocusing." Optomechatronic Systems III. vol. 4902. International Society for Optics and Photonics, 2002. (Year: 2002).*
International Search Report for PCT/US2021/044999 dated Dec. 2, 2021.

* cited by examiner

*Primary Examiner* — Sean M Conner
(74) *Attorney, Agent, or Firm* — Thomas | Horstemeyer, LLP

(57) ABSTRACT

Various examples are provided related to face identification of material. An image can be captured by a vision system and feature parameters determined and compared to a material feature database to determine which face of the material is being presented. The vision system can employ a set of parameters for configuration to acquire the image. The system can communicate the identification to downstream processes in real time. A near-universal, color agnostic, angular orientation independent identification of material faces can be determined without the need for physical manipulation of the material.

17 Claims, 8 Drawing Sheets

| Material ID | Light Intensity (Lux) | Wavelength (nm) | Focal Length (mm) | Exposure Time (ms) |
| --- | --- | --- | --- | --- |
| 0001 | 30000 | 365 (UV) | 12.0 | 1.0 |
| 0002 | 30000 | 395 (UV) | 12.0 | 1.1 |
| 0003 | 25000 | 470 (Blue) | 11.95 | 1.0 |
| 0004 | 150000 | 560 (Green) | 12.05 | 1.2 |
| 0005 | 20000 | 625 (Red) | 11.95 | 2.1 |
| 0006 | 20000 | 850 (IR) | 12.05 | 1.3 |
| 0007 | 25000 | 940 (NIR) | 12.05 | 1.4 |
| 0008 | 20000 | White | 11.90 | 1.0 |

FIG. 7A

| Material ID | Image ID | Channel Response | Color | Label |
|---|---|---|---|---|
| 0001 | 0001-00001 | (1.2,3.2,4.3) | (50,67,81) | Front |
| 0001 | 0001-00002 | (2.1,3.1,4.4) | (50,67,81) | Front |
| 0001 | 0001-00003 | (3.1,1.2,3.5) | (50,67,81) | Front |
| 0001 | 0001-00004 | (3.2,4.3,5.0) | (45,67,81) | Back |
| 0001 | 0001-00005 | (6.7,4.5,2.1) | (45,67,81) | Back |
| 0002 | 0002-00001 | (7.3,1.0,3.2) | (34, 64, 79) | Front |
| 0002 | 0002-00002 | (2.3,4.3,5.6) | (34, 64, 79) | Front |
| 0002 | 0002-00003 | (3.4,4.5,6.7) | (30, 64, 79) | Back |

FIG. 7B

| Material ID | Model ID |
|---|---|
| 0001 | 0001-01 |
| 0002 | 0002-01 |
| 0003 | 0003-02 |
| 0004 | 0004-01 |
| 0005 | 0005-04 |
| 0006 | 0006-01 |
| 0007 | 0007-01 |
| 0008 | 0008-02 |

FIG. 7C

SYSTEMS AND METHODS FOR COLOR AGNOSTIC MATERIAL FACE DETECTION

BACKGROUND

Most materials, particularly those used in sewing applications, have distinct sides. While it is a relatively complicated task for a human operator to identify the correct side and ensure the proper orientation, it is far more challenging for a machine to do. Existing methods of determining the proper side of a material require human involvement, typically via visual inspection, using magnification optics if needed. Issues can arise if the human involved is colorblind, not to mention the more universal issue of fatigue, which increases the likelihood of errors. Some methods of identifying a material require physical handling of the material sample. In the case of these materials, this can change the material structure which may create difficulties for processing these materials in later manufacturing steps.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

FIGS. 7A-7C illustrate examples of imaging parameters, material feature and model databases, according to various embodiments of the present disclosure.

DETAILED DESCRIPTION

Figure 1:
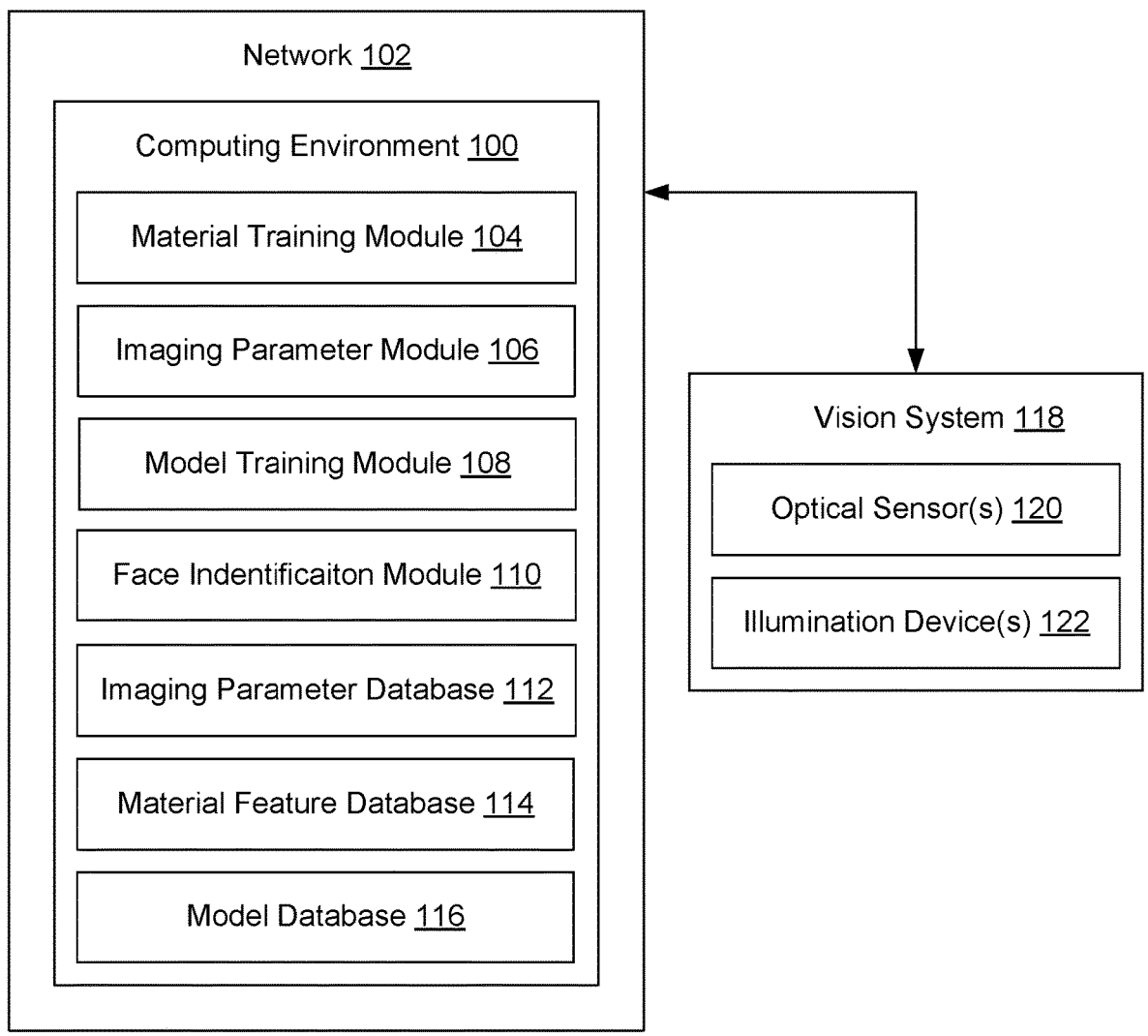
FIG. 1 illustrates an example of a color agnostic material face identification vision system, according to various embodiments of the present disclosure.

Disclosed herein are various examples related to material face identification for processing in, e.g., the automated production of sewn products. The present disclosure is generally related to methods and systems that can automatically identify the correct side of a material (e.g., a piece of fabric, textile, or other material) and ensure the proper orientation for processing. Reference will now be made in detail to the description of the embodiments as illustrated in the drawings, wherein like reference numbers indicate like parts throughout the several views.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Referring to FIG. 1, shown is an example of a system that can be used for color agnostic material face identification. As shown in the example of FIG. 1, a computing environment 100 can be provided in a network environment 102, which can include, e.g., the Internet, intranets, extranets, wide area networks (WANs), local area networks (LANs), wired networks, wireless networks, or other suitable networks, etc., or any combination of two or more such networks. In one embodiment, the network 102 may be a distributed cloud of processing and storage assets or a local network. In some embodiments, the computing environment 100 can be coupled to various material identification system components (e.g., a vision system 118) using direct connections.

The computing environment 100 can comprise, for example, a server computer or any other computing or processing system that can provide computing and/or data storage capability. Alternatively, the computing environment 100 may employ a plurality of computing devices arranged, for example, in one or more server or computer banks or other arrangements. Such computing devices may be located in a single installation or distributed among different geographical locations. For example, the computing environment 100 may include a plurality of computing devices that together comprise a cloud computing resource, a grid computing resource, and/or any other distributed computing arrangement. In some cases, the computing environment 100 may correspond to an elastic computing resource where the allotted capacity of processing, network, storage, or other computing-related resources may vary over time. The computing environment 100 can include controllers (e.g., microprocessors or processing circuitry) of equipment for processing material (e.g., fabric, textiles or other materials).

Various applications and/or other functionality may be executed in the computing environment 100 according to various embodiments. Also, various data may be stored in a data store or database that is accessible to the computing environment 100. In certain embodiments, the data store may be representative of or comprise a plurality of data stores or databases. The data stored in the data store, for example, may be associated with operation or execution of the various applications, components, and/or functional elements described below.

The computing environment 100 may be configured to execute various modules or applications such as a material training module 104, imaging parameter module 106, model training module 108, face identification module 110 and/or other applications. The data or information stored in the computing environment 100 includes, for example, an imaging parameter database 112, material feature database 114, modal database 116 or other databases and/or types of data/information storage. A vision system 118 can be communicatively coupled to the computing environment 100 via the network 102. The vision system 118 can provide image or other sensor data or information utilizing one or more optical sensor(s) 120, illumination device(s) 122 or other sensing devices.

The material training module 104 operating in the computing environment 100 can determine imaging parameters from captured images of material test samples presented to a vision system 118 using the imaging parameter module 106. The material training module 104 can also use a model training module 108 to extract the material features needed to build a unique material fingerprint associated with the imaged material type. The material features can be used by the model training module 108 to train a machine learning model which can be used for face determination of material of the same type or similar type. After receiving material (e.g., a piece of fabric, textile, or other material) for processing, the face identification module 110 can collect one or more images of the material using imaging parameters previously determined by the imaging parameter module 106 and generate a face prediction using a machine learning model trained by the model training module 108. The face prediction can indicate if the correct side of the material is presented to the vision system 118. Processing of the piece of material, or other actions or operations, can then be initiated in response to the face prediction.

The imaging parameter database 112 can store imaging parameters selected by the imaging parameter module 106. The imaging parameters can include, e.g., a value of light intensity, wavelength, trigger time (duration of time the light is turned on), within the range of operation of at least one Illumination device 122 and a focal length, and exposure time within the range of operation of at least one optical sensor 120. The imaging parameter module 106 can acquire sample images with different sets of imaging parameters. The imaging parameter module 106 can calculate a quality score for each sample image and compare the quality scores, selecting the sample image with the quality score representing the desired or specified quality. In one embodiment, the quality score may comprise a contrast to noise ratio. The imaging parameter module 106 can save the imaging parameters used to acquire the sample images to the imaging parameter database 112. The imaging parameters associated with the best quality score can be associated with the type of material images for later use.

The model training module 108 can receive parameters from the imaging parameter database 112 and can use the stored imaging parameters to acquire at least one image of the material, calculate and save the image features, providing a simplified representation of the image, to the material feature database 114. The collected image features stored in the material feature database 114 can be used to train a machine learning model, which can be saved in the model database 116. The model database 116 can store the machine learning models trained by the model training module 108.

A vision system 118 comprises at least one optical sensor 120, which can be fixed or configurable. The vision system 118 can also comprise at least one illumination device 122, which can be fixed or configurable. In one embodiment, the optical sensor 120 can be a single configurable device. In alternative embodiments, the optical sensor 120 can be an array of optical sensors. In one embodiment, the illumination device 122 can be a single configurable device. In other embodiments, the illumination device 122 can be an array of illumination devices. In various embodiments, illumination can be provided by ambient lighting. The optical sensor 120 can be configured to capture an image of a piece of material (e.g., a piece of fabric, textile, or other material). The optical sensor 120 being configurable, can allow for the changing of any of the focal length or exposure time of the optical sensor 120. The illumination device 122 can comprise at least one illumination device capable of illuminating the surface of the piece of material. The illumination device 122 being configurable, can allow for the intensity, exposure or trigger time and/or wavelength to be changed. The vision system 118, optical sensor(s) 120 and/or illumination device(s) 122 can be communicatively coupled to the computing environment 100 through the network environment 102, through direct connections, or a combination of both.

Functioning of the material training module 104 will now be discussed with reference to FIG. 2. One skilled in the art will appreciate that, for this and other processes and methods disclosed herein, the functions performed in the processes and methods may be implemented in differing order. Furthermore, the outlined operations are provided as examples, and some of the operations may be optional, combined into fewer operations, or expanded into additional operations without detracting from the essence of the disclosed embodiments.

Figure 2:
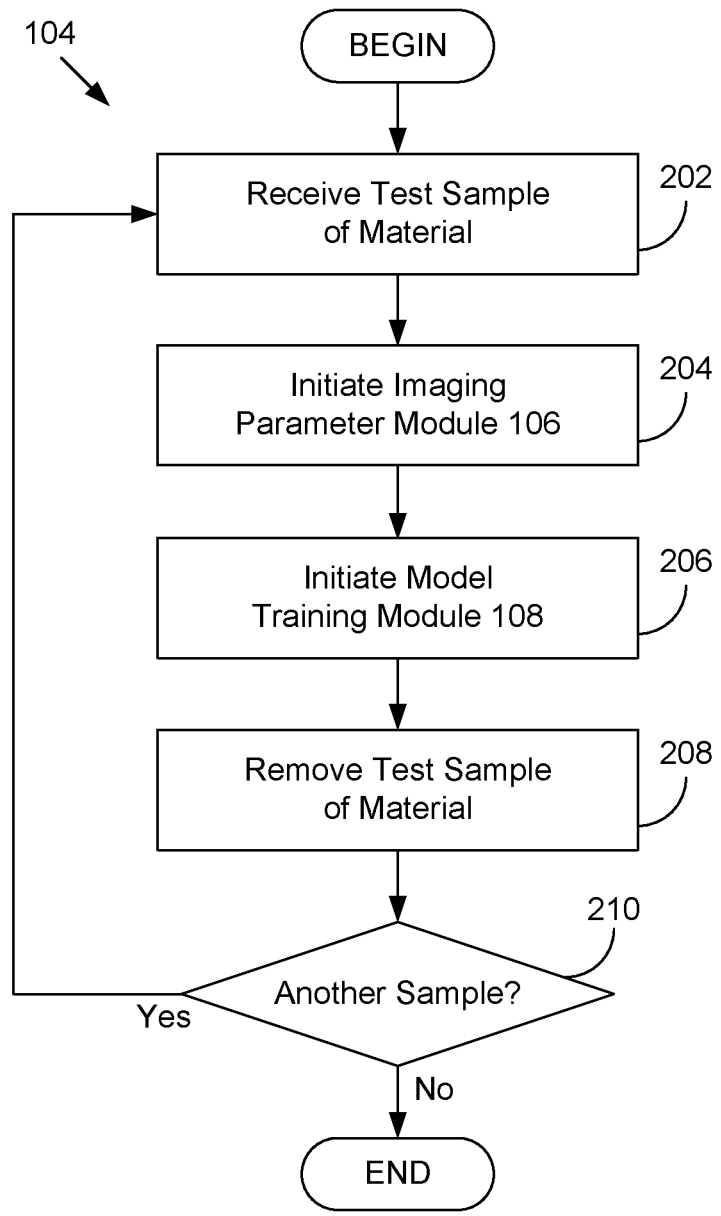
FIG. 2 illustrates an example of a material training module, according to various embodiments of the present disclosure.

FIG. 2 shows a flowchart illustrating an example of the material training module operation. Beginning at 202, a test sample of the material (e.g., a piece of fabric, textile, or other material) is received to present a face to be identified to the vision system 118 (FIG. 1). The material training module 104 can determine when the vision system 118 detects that a piece of material is present. At 204, the material training module 104 can initiate the imaging parameter module 106, as will be discussed, to determine imaging parameters to use in the face identification. The imaging parameter database 112 (FIG. 1) can store imaging parameters selected by the imaging parameter module 106. The imaging parameters can include, but are not limited to, a material ID associated with the material being processed, a value of light intensity (Lux) and/or wavelength (nm) within the range of operation of at least one illumination device 122 (FIG. 1), and a focal length (mm) and/or exposure length (ms) within the range of operation of at least one optical sensor 120 (FIG. 1).

The model training module 108 can be initiated at 206, where a machine learning model is trained using image features extracted from captured images of the material as will be discussed. The material feature database 114 (FIG. 1) can store images acquired by the model training module 108 or the imaging parameter module 106. The corresponding image features can also be stored in the material feature database 114. The material feature database 112 can also contain an associated material ID of the material (e.g., a piece of fabric, textile, or other material) being processed, the image(s) captured by the model training module 108 and a corresponding image ID, channel response data points, color data points, and/or a determination if the images and data are for the front or back of the material, which in some embodiments may be a user input for training purposes.

The model database 116 (FIG. 1) can store machine learning models trained by the model training module 108. The model database 116 can contain the material ID associated with the material, the model ID associated with the correct machine learning model which may contain the model representation parameters collected by the model training module 108 such weights of the class features, constants in the decision function, class labels and stopping criteria. The test sample of material can be removed at 208 and, if there is no additional test sample to be considered at 210, the material training module 104 can end. Otherwise, the process flow can return to 202 where the next test sample of material can be provided.

Functioning of the imaging parameter module 106 will now be discussed with reference to FIG. 3. One skilled in the art will appreciate that, for this and other processes and methods disclosed herein, the functions performed in the processes and methods may be implemented in differing order. Furthermore, the outlined operations are provided as examples, and some of the operations may be optional, combined into fewer operations, or expanded into additional operations without detracting from the essence of the disclosed embodiments.

Figure 3:
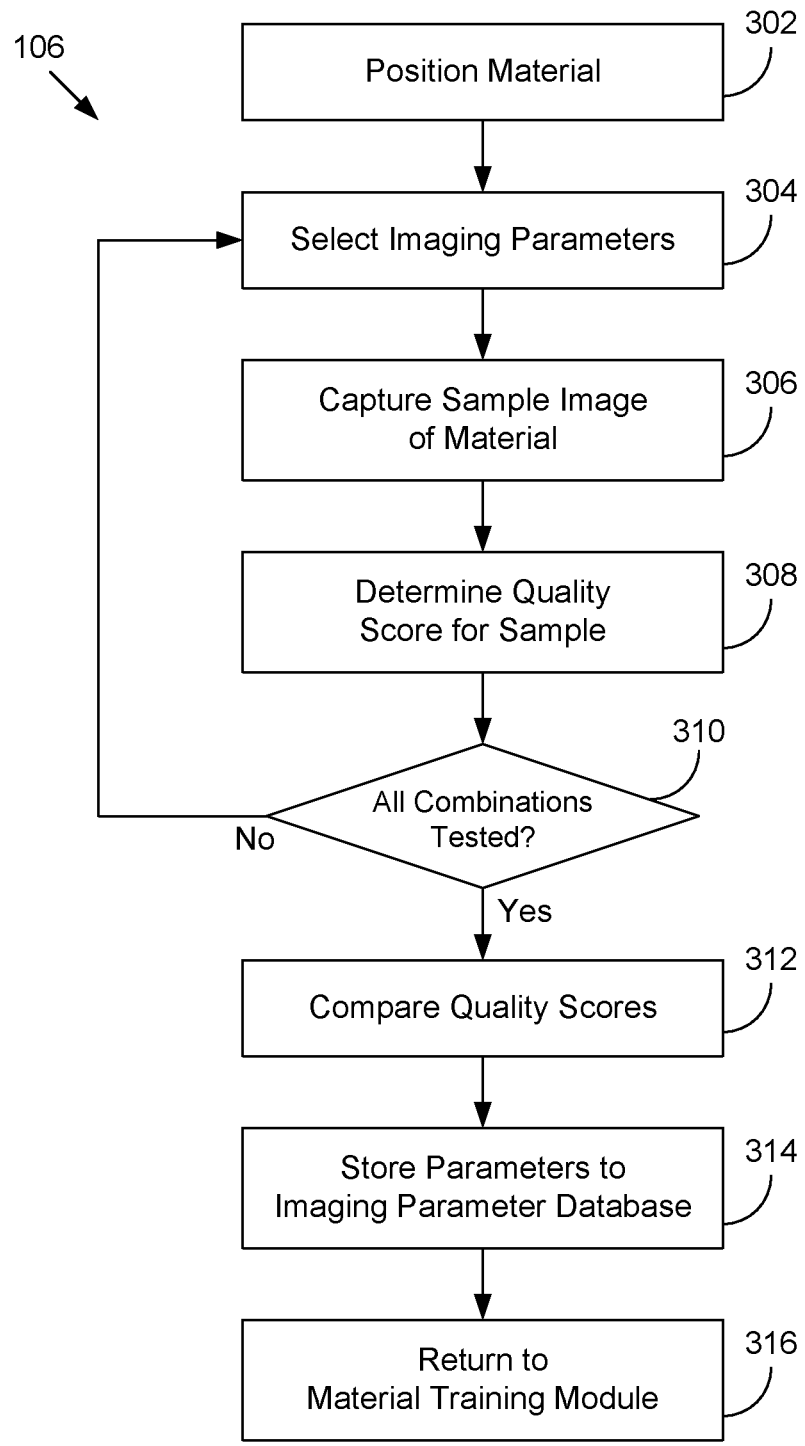
FIG. 3 illustrates an example of an imaging parameter module, according to various embodiments of the present disclosure.

FIG. 3 shows a flowchart illustrating an example of the imaging parameter module operation. Referring to 204 of FIG. 2, the imaging parameter module 106 can be initiated by the material training module 104 after receiving the test sample material. At 302 the material can be positioned in an imaging or work area for processing. At 304, the imaging parameter module 106 selects a set of imaging parameters associated with the test sample of material being imaged. The imaging parameters can comprise, e.g., any of the illumination intensity, wavelength of the illumination device 122 and/or the focal length or exposure length of the optical sensor 120. For example, the illumination device 122 may be configured for an intensity of 10000 Lux and a wavelength of 500 nm, and the optical sensor 120 may be configured for a focal length of 12 mm and an exposure length of 5 milliseconds.

A sample image of the material (e.g., a piece of fabric, textile, or other material) can be captured with the vision system 118 using the set of imaging parameters at 306. The imaging parameter module 106 can then determine a quality score for the captured sample image at 308. In one embodiment, the quality score comprises a contrast to noise ratio. In other embodiments, a human operator or user can make a section based on images generated with various imaging parameters. The operator or user can rank images by quality, from a set of images that were acquired with various combinations of parameters. In yet another embodiment, a human operator may tune the imaging parameters that produces the optimum image quality. At 310, the imaging parameter module 106 determines if all desired combinations of relevant imaging parameters have been attempted, for example different combinations of exposure times (ms), intensity of illumination, focal length, etc. If there are possible combinations remaining, the flow can return to 304 to select another set or combination of imaging parameters. In some embodiments, an ensemble quality score can be determined from quality scores determined from sample images of multiple areas of the material under evaluation. For example, the area of the material being imaged can be changed (e.g., by repositioning the piece of material and/or the vision system 118) before capturing images with different imaging parameters.

If it is determined at 310 that all desired imaging parameter combinations have been attempted, then the imaging parameter module 106 compares the quality scores for all the imaging parameter combinations at 312. Based on the comparison, the combination of imaging parameters that has the desired or optimized quality score can be selected, and those imaging parameters associated with the selected quality score can be stored for subsequent access and use, e.g., by the model training module. At 314, the imaging parameter module 106 can store the imaging parameters in the imaging parameter database 112 along with an associated material ID to identify the material for future use. The imaging parameter module 106 may also store one or more test image(s) associated with the imaging parameters in the material feature database 114, which can be used by the model training module 108. The imaging parameter module 106 then returns to the material training module 104 at 316.

Functioning of the model training module 108 will now be discussed with reference to FIG. 4. One skilled in the art will appreciate that, for this and other processes and methods disclosed herein, the functions performed in the processes and methods may be implemented in differing order. Furthermore, the outlined operations are provided as examples, and some of the operations may be optional, combined into fewer operations, or expanded into additional operations without detracting from the essence of the disclosed embodiments.

Figure 4:
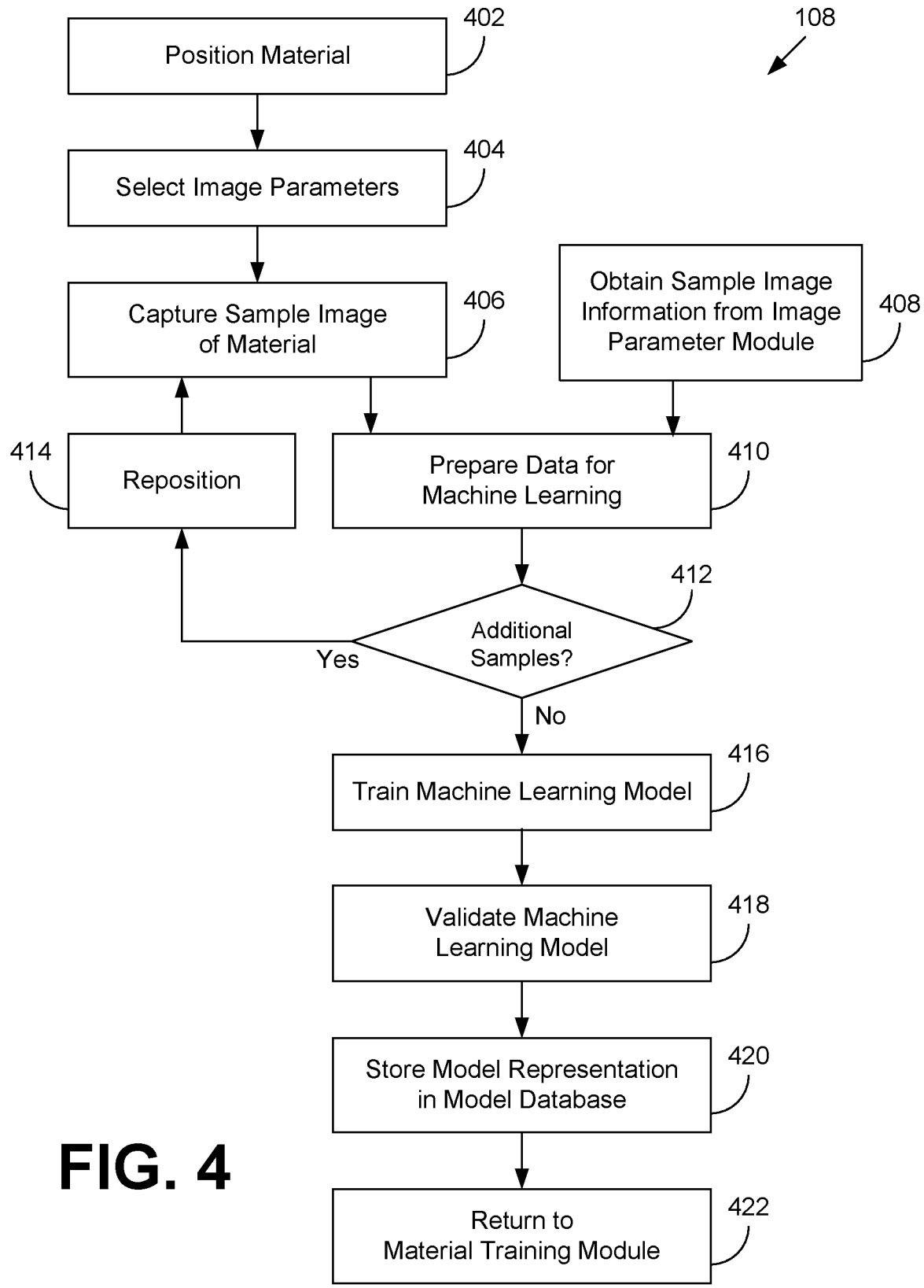
FIG. 4 illustrates an example of a model training module, according to various embodiments of the present disclosure.

FIG. 4 shows a flowchart illustrating an example of the model training module operation. Referring to 206 of FIG. 2, the model training module 108 can be initiated by the material training module 104 after determining the imaging parameters at 106. At 402, the material can be positioned in an imaging or work area for processing. This material can be the test sample received at 202 of FIG. 2 or can be another piece of the same or similar material. At 404, the model training module 108 selects a set of imaging parameters associated with the material being imaged. The imaging parameters can be retrieved from the imaging parameter database 112 based upon the material ID associated with the material being imaged. The material ID can be identified by a user or can be determined by the model training module 108 based upon, e.g., a marker or other identifiable indication on the piece of material. The imaging parameters can comprise, e.g., any of the illumination intensity or wavelength of the illumination device 122 and/or the focal length or exposure length of the optical sensor 120.

A sample image of the material (e.g., a piece of fabric, textile, or other material) can be captured with the vision system 118 at 406. The vision system 118 can be configured to capture the sample image using the imaging parameters selected by the model training module 108 at 404. In some embodiments, the model training module 108 can obtain (at 408) one or more sample image(s) of the material captured by the image parameter module associated with the selected imaging parameters. For example, a plurality of sample images can be captured at various rotational orientations.

The material can be rotated or the vision system 118 or optical sensor 120 can be rotated to capture the sample images at different orientations. These images can be obtained from the material feature database 114 or can be provided to the model training module by the imaging parameter module 106. At 410, material feature data can be prepared for use in training and/or validating the machine learning model, as will be discussed. The material features such as, but not limited to, color information and texture information (e.g., channel responses) can be extracted from the captured sample image(s). The feature information can be compacted to provide a compact feature set for use by the model training module 108. The feature data can be stored in the material feature database 114.

The model training module 108 then determines at 412 if an additional sample is needed. For example, there may be a predetermined number of samples specified prior to determining the machine learning model to reduce or minimize errors. In some embodiments, sample images may be obtained in each quadrant, or other defined pattern, of the material. If it is determined that another sample image is needed at 412, then a different area or region of interest of the material can be imaged to generate additional material feature data. The imaged area can be changed at 414 by repositioning the piece of material and/or by repositioning the vision system 118. The flow then returns to 406 where another sample image is captured.

In some implementations, the model training module 108 can prepare data from images captured from both sides of the material. After the first side of the material has been imaged to train the machine learning model, the material may be flipped via, e.g., an end effector, actuator, or manually and repositioned at 414. The process can then return to 406 to begin capturing sample images of the second side and preparing the data for machine learning at 410. In some embodiments, data may be collected from both sides of the material as the two distinct faces (or sides) as opposed to using the texture data points and color data points as the two sets of data points. The feature data can be stored in the material feature database 114 including label indicating which side of the material (e.g., front or back) is associated with the prepared feature data.

If no additional samples are needed at 412, the model training module 108 can begin training a machine learning model at 416. Some or all of this compact material feature representation can be employed to train the machine learning model in 416. In one embodiment this may be a support vector machine. In another embodiment, this may be a clustering-based method, wavelet analysis, or convolutional neural network. The unused fraction of the compact material feature representation can then be used to cross-validate the trained model at 418. In some embodiments, additional data may be collected to validate the trained model. The parameters that represent the machine learning model can be stored in the model database 116 (FIG. 1) at 420. In some embodiments, there may be additional data stored at 420 in the model database 116 such as a correlation coefficient or the data points themselves. The model training module 108 then returns to the material training module 104 at 422.

Functioning of the data preparation for machine learning 410 will now be discussed with reference to FIG. 5. One skilled in the art will appreciate that, for this and other processes and methods disclosed herein, the functions performed in the processes and methods may be implemented in differing order. Furthermore, the outlined operations are provided as examples, and some of the operations may be optional, combined into fewer operations, or expanded into additional operations without detracting from the essence of the disclosed embodiments.

Figure 5:
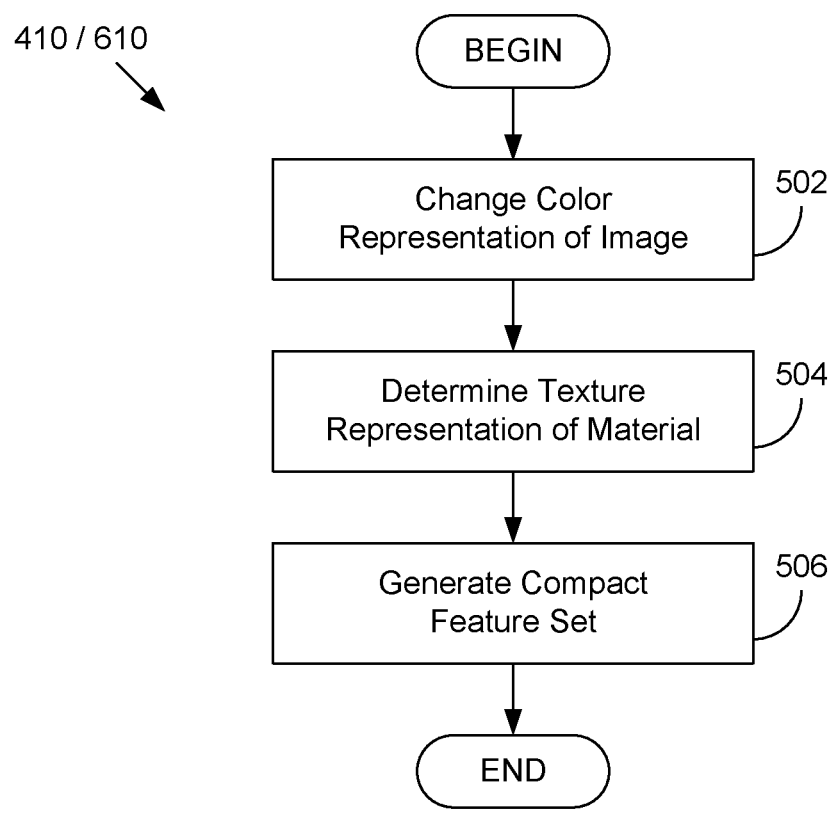
FIG. 5 illustrates an example of image data preparation for machine learning or material face identification, according to various embodiments of the present disclosure.

FIG. 5 shows a flowchart illustrating an example of the data preparation operation, which may be used to prepare data extracted from the sample images captured or obtained by the model training module 108. For example, the data preparation 410 (FIG. 4) by the model training module 108 can begin by changing the color representation of a sample image at 502. The color can be represented through a Lab color space, also known as CIELab color space or CIE L*a*b*. Lab color space expresses color as three values, the "L*" refers to lightness from black to white, represented as 0 (black) to 100 (white). The "a*" from green to red and the "b*" from blue to yellow.

An alternate representation could be made using the HSV color space. All the color information is then represented in the hue channel, and the saturation and value channels represent most of the texture information. The hue channel can be ignored completely to make any further processing not sensitive to color variations.

The model training module 108 can then determine the filter responses across multiple channels that describe the texture features in the material from the individual color channels (i.e. HSV/L*/a*/b* channel) at 504. The filter response from each channel are used independently or in combination with filter responses from other channels. In various embodiments, texture features can be determined by using filters such as gabor filters that are sensitive to specific spatial frequencies (channel). In other embodiments, texture features can be determined by grey level co-occurrence matrices (GLCM) at step 504. In yet another embodiment, convolutional neural networks or wavelet analysis may be used to automatically extract and encode the texture features of interest.

The material features determined in step 504 may be large in dimension, sparse and contain redundancies. If it is determined that additional data is not needed, this inefficiency in material feature representation can be removed by determining a compact representation that is a faithful approximation of the complete larger feature set (from 504) at 506. A large fraction of this compact material feature representation can then be employed by the model training module 108 to train the machine learning model in 416 of FIG. 4. In one embodiment this may be a support vector machine. In another embodiment, this may be a clustering-based method. The unused fraction of the compact material feature representation can then be used by the model training module 108 to cross-validate the trained model at 418.

Functioning of the face identification module 110 will now be discussed with reference to FIG. 6. One skilled in the art will appreciate that, for this and other processes and methods disclosed herein, the functions performed in the processes and methods may be implemented in differing order. Furthermore, the outlined operations are provided as examples, and some of the operations may be optional, combined into fewer operations, or expanded into additional operations without detracting from the essence of the disclosed embodiments.

Figure 6:
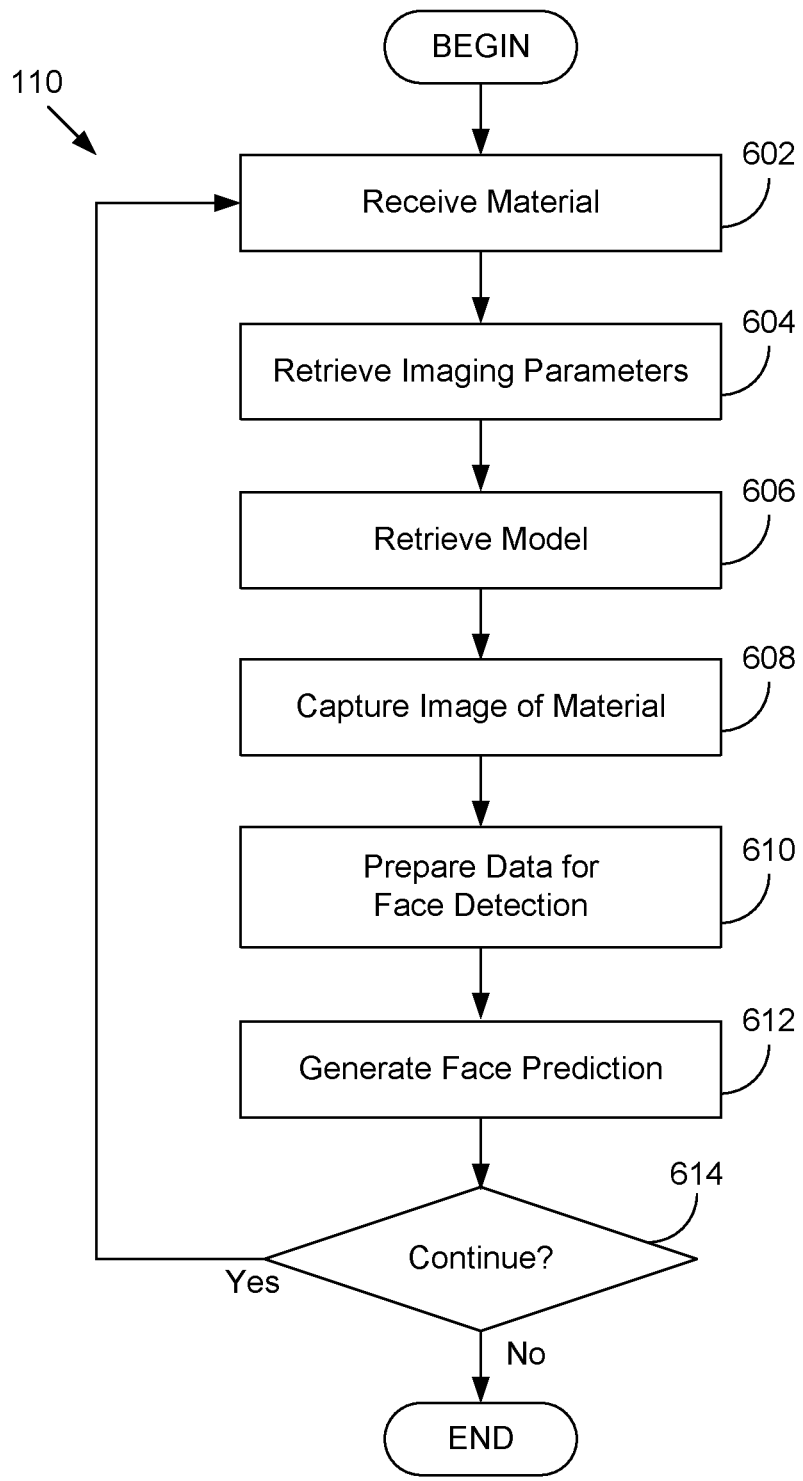
FIG. 6 illustrates an example of a face identification module, according to various embodiments of the present disclosure.

FIG. 6 shows a flowchart illustrating an example of face identification module operation. Beginning at 602, a piece of material (e.g., a piece of fabric, textile, or other material) is received to the vision system 118 (FIG. 1) to identify which face (e.g., front side or back side) of the material is being presented for further processing. The face identification module 110 can determine when the vision system 118 detects that a piece of material is present. The material can be positioned in an imaging or work area to present a face to be identified to the vision system 118. At 604, the face identification module 110 can retrieve a set of imaging parameters associated with the piece of material being imaged. The imaging parameters can be retrieved from the imaging parameter database 112 (FIG. 1) based upon the material ID associated with the material being imaged. The material ID can be identified by a user or can be determined by the face identification module 110 based upon, e.g., a marker or other identifiable indication on the piece of material. The imaging parameters can include, but are not limited to, a material ID associated with the material being processed, a value of light intensity (Lux) and/or wavelength (nm) within the range of operation of at least one illumination device 122 (FIG. 1), and a focal length (mm) and/or exposure length (ms) within the range of operation of at least one optical sensor 120 (FIG. 1).

At 606, the face identification module 110 can retrieve a trained machine learning model associated with the piece of material being imaged. The machine learning model can be retrieved from the model database 116 (FIG. 1) based upon a material ID associated with the material being presented. The material ID can be identified by a user or can be determined by the face identification module 110 based upon, e.g., a marker or other identifiable indication on the piece of material. An image of the material (e.g., a piece of fabric, textile, or other material) can be captured with the vision system 118 at 608. The vision system 118 can be configured to capture the image using the imaging parameters retrieved by the face identification module 110 at 604.

At 610, material feature data can be prepared for use in identification of the face (e.g., front or back side) of the material being presented. The material features such as, but not limited to, color information and texture information (e.g., channel responses) can be extracted from the image captured at 608. The feature information can be compacted to provide a compact feature set for use by the face identification module 110. In some embodiments, the feature data and captured image may be stored in, e.g., the material feature database 114 and the imaging parameter database 112.

As illustrated in the example of FIG. 5, the data preparation 610 by the face identification module 110 can begin by changing the color representation of a sample image at 502. The color can be represented through a Lab color space, also known as CIELab color space or CIE L*a*b*. Lab color space expresses color as three values, the "L*" refers to lightness from black to white, represented as 0 (black) to 100 (white). The "a*" from green to red and the "b*" from blue to yellow.

An alternate representation could be made using the HSV color space. All the color information is then represented in the hue channel, and the saturation and value channels represent most of the texture information. The hue channel can be ignored completely to make any further processing not sensitive to color variations.

The face identification module 110 can then determine the channel responses that describe the texture features in the material from the individual color channels (i.e. HSV/L*/a*/b* channel) at 504. The channel response from each channel are used independently or in combination with channel responses from other channels. In various embodiments, texture features can be determined by using filters such as gabor filters that are sensitive to specific spatial frequencies. In other embodiments, texture features can be determined by grey level co-occurrence matrices (GLCM) at step 504. In yet another embodiment, convolutional neural networks or wavelet analysis may be used to automatically extract and encode the texture features of interest.

The material features determined in step 504 may be large in dimension, sparse and contain redundancies. This inefficiency in material feature representation can be removed by determining a compact representation that is a faithful approximation of the complete larger feature set (from 504) at 506. The prepared material feature data can be provided to the trained machine learning model for generation of a face prediction at 612. For example, the compact representation from 506 can be provided to the trained machine learning model for generating a confidence score for the presented face at 612. The confidence score for the face presented to the vision system 118 can be used to determine if the correct face of the material is presented. For example, the face identification can be based upon a comparison of the predicted confidence score to a predefined threshold.

A wide range of actions may be carried out in response to the face identification. If the correct face of the material has been identified at 612, the automated sewing process can be allowed to continue processing the material. In some cases, the correct face of the material may be identified by a marker or stamp applied to the exposed face for identification during subsequent processing of the material. If it is determined at 612 that the incorrect face of the material has been presented to the vision system 118, then the material can be flipped via, e.g., an end effector, actuator, or by some other automated means to allow the automated sewing process to continue and the flow. In some embodiments, a face prediction may be generated for the second side after flipping the material and before further processing of the material. The flow can return to 608 to capture an image of the second side, followed by data preparation at 610 and face prediction generation at 612 as previously described. At 614, it can be determined if the face of another piece of material is to be identified. If so, the flow returns to 602 in order to prepare to receive the next incoming piece of material. If not, then the face detection can end.

Functioning of the imaging parameter database 112, material feature database 114 and model database 116 (FIG. 1) will now be discussed with reference to FIGS. 7A-7C, respectively. One skilled in the art will appreciate that, for this and other processes and methods disclosed herein, the functions performed in the processes and methods may be implemented in differing order. Furthermore, the outlined operations are provided as examples, and some of the operations may be optional, combined into fewer operations, or expanded into additional operations without detracting from the essence of the disclosed embodiments.

FIG. 7A illustrates an example of the information and parameters included in the imaging parameter database 112. The imaging parameter database 112 can store imaging parameters selected by the imaging parameter module 106. The imaging parameters can include, but are not limited to, a value of light intensity or wavelength within the range of operation of at least one illumination device 122 (FIG. 1) and a focal length and exposure length within the range of operation of at least one optical sensor 120 (FIG. 1).

FIG. 7B illustrates an example of the information and parameters included in the material feature database 114. The material feature database 114 can store images acquired by the model training module 108. The stored images can be used to train a machine learning model. The material feature database 114 can also contain an associated material ID or fingerprint of the material being processed, the image captured by the model training module 108, the texture feature data points, the color data points, and/or a determination if the images and data are for the front or back of the material which in some embodiments may be a user input for training purposes. In some embodiments, the material feature database 114 can also store the image captured by the face identification module 110 and its associated material feature data.

FIG. 7C illustrates an example of the information and parameters included in the model database 116. The model database 116 can store machine learning models trained by the model training module 108. The model database 116 can contain the material ID associated with the material and the model ID associated with the correct model, which may contain the model representation parameters collected by the model training module 108 such as the texture feature data points or color data points.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A material face identification system, comprising:
a vision system comprising at least one optical sensor configured to obtain images of a work area;
a face identification module; and
processing circuitry comprising a processor, wherein execution of the face identification module by the processor causes the processing circuitry to:
obtain imaging parameters associated with a piece of material provided to the work area, the piece of material having a first side exposed to the at least one optical sensor and a second side opposite the first side;
initiate capture of an image of at least a portion of the exposed first side of the piece of material by the vision system, where the vision system is configured to capture the image with the at least one optical sensor based upon the imaging parameters; and
determine whether the exposed first side is a correct face of the piece of material that is facing upward in the work area based upon a confidence score generated using feature data determined from the image of the exposed first side of the piece of material,
wherein the imaging parameters associated with the piece of material are retrieved from an imaging parameter database based upon a material ID associated with the piece of material, and
wherein a machine learning model is selected based upon the material ID, the machine learning model being selected from among a plurality of machine learning models respectively trained in association with a plurality of materials, the selected machine learning model trained to generate the confidence score based upon the feature data determined from the image of the piece of material associated with the material ID.

2. The material face identification system of claim 1, wherein a machine learning model associated with the piece of material generates the confidence score based upon the feature data extracted from the image of the exposed first side of the piece of material.

3. The material face identification system of claim 2, wherein the feature data comprises a compact feature set generated from material features of the piece of material.

4. The material face identification system of claim 3, wherein the material features are extracted from the image of the exposed first side of the piece of material.

5. The material face identification system of claim 4, wherein the material features comprise filtered channel response that are devoid of color information.

6. The material face identification system of claim 4, wherein the material features are based at least in part upon material texture.

7. The material face identification system of claim 2, wherein a second confidence score is generated for the second side of the piece of material, where the correct face is determined at least in part upon the confidence scores.

8. The material face identification system of claim 1, wherein execution of the face identification module determines if the piece of material is present in the work area.

9. The material face identification system of claim 1, wherein the piece of material is flipped to expose the second side of the piece of material in response to the correct face not facing upward.

10. The material face identification system of claim 1, wherein the imaging parameters are determined based upon quality scores generated for a plurality of test images of a face of at least one sample of the material, the plurality of test images captured with different combinations of imaging parameters.

11. The material face identification system of claim 10, wherein the imaging parameters corresponding to the quality score that is highest are used to capture the image of the piece of material.

12. The material face identification system of claim 2, wherein the machine learning model is trained based upon material features determined from at least one sample image of a face of at least one sample of the material.

13. The material face identification system of claim 12, wherein a compact feature set generated from the material features is used to train the machine learning model corresponding to the at least one sample of the material.

14. The material face identification system of claim 12, wherein the at least one sample image comprises images obtained at different locations on the at least one sample of the material.

15. The material face identification system of claim 14, wherein the machine learning model is trained for both faces of the at least one sample of the material.

16. The material face identification system of claim 12, wherein the material features comprise texture features from at least one image of the at least one sample of the material.

17. The material face identification system of claim 12, wherein the material features comprise filtered channel response that are devoid of color information.

\* \* \* \* \*